Figure 1:
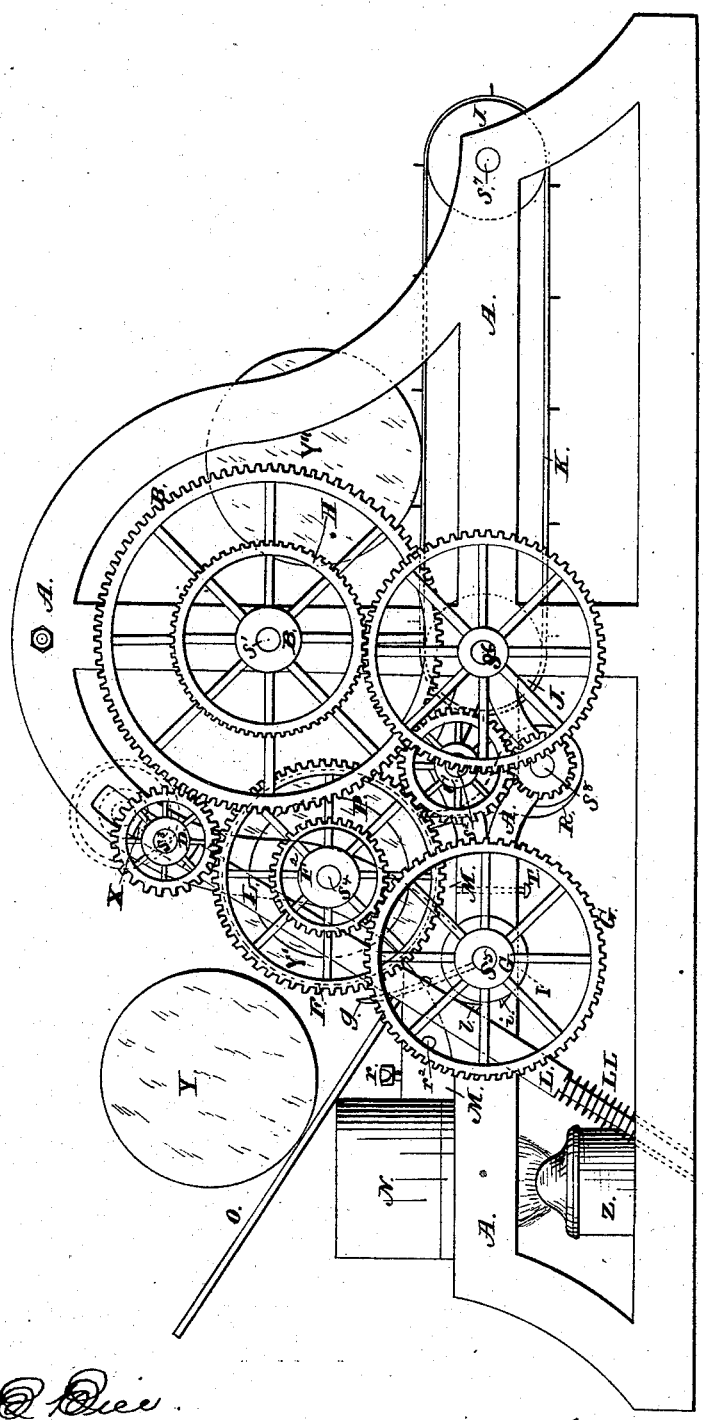

(No Model.) 2 Sheets—Sheet 1.

J. A. FORBES.
Automatic Soldering Machine.

No. 238,224. Patented March 1, 1881.

Attest. Inventor.

(No Model.) 2 Sheets—Sheet 2.
J. A. FORBES.
Automatic Soldering Machine.
No. 238,224. Patented March 1, 1881.
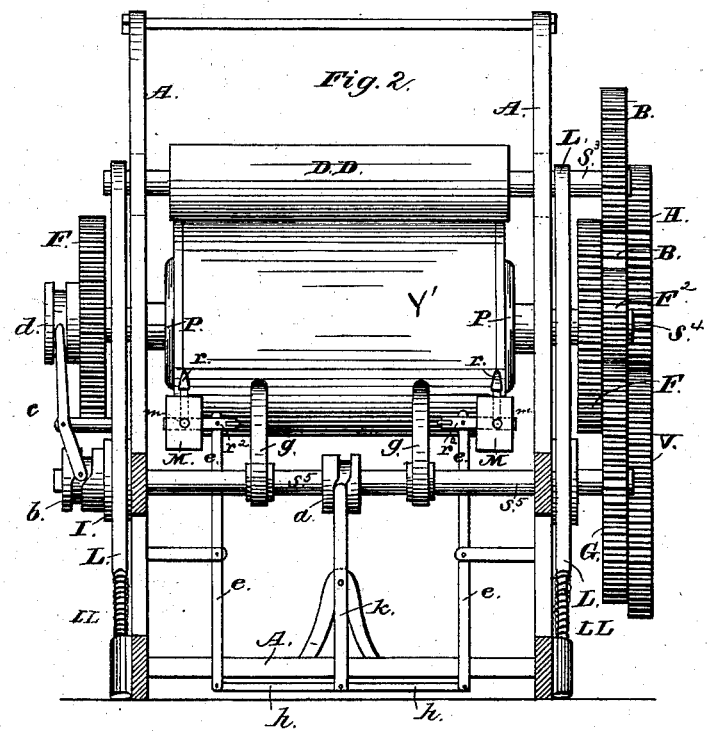
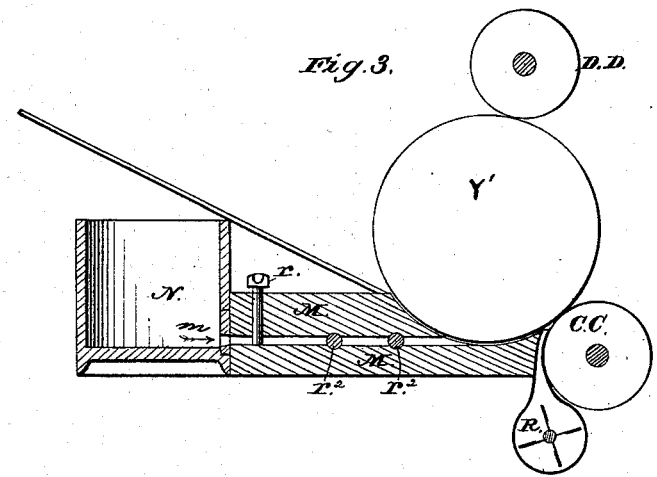
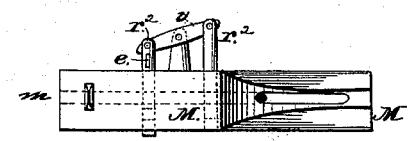

UNITED STATES PATENT OFFICE.

JOHN A. FORBES, OF DOVER, DELAWARE, ASSIGNOR OF ONE-HALF TO FREDERIC A. WILLIAMS, OF SAME PLACE.

AUTOMATIC SOLDERING-MACHINE.

SPECIFICATION forming part of Letters Patent No. 238,224, dated March 1, 1881.

Application filed January 3, 1881. (No model.)

*To all whom it may concern:*

Be it known that I, JOHN ALEXANDER FORBES, of Dover, in the county of Kent and State of Delaware, have invented certain new and useful Improvements in an Automatic Soldering-Machine; and I do hereby declare that the following is a full, clear, and exact description of the invention, which will enable others skilled in the art to which it appertains to make and use the same, reference being had to the accompanying drawings, which form a part of this specification.

My invention relates to the construction of automatic machinery and devices for soldering cans, tinware generally, and other packages.

My objects are, first, to provide a soldering-machine which will dispense as far as possible with hand-labor in making cans; and, second, to provide suitable mechanism for soldering two or more seams at one and the same time. My devices accomplish this by delivering the unsoldered cans to the machine, soldering the heads upon the body of the can, and removing the soldered can from the machine, all by automatic mechanical means, without stoppage of the machinery or intervention of hand-labor.

Figure 1 is a side view of the machine in working position. Fig. 2 is a front view of the machine, the feeding apparatus O being removed. Fig. 3 is a sectional view of the interior of the machine, illustrating the soldering operation only. Fig. 4 represents the contrivance for regulating the flow and discharge of molten solder.

In Fig. 1, A is a frame on each side of the machine to furnish bearings for the several shafts $S'$, $S^2$, $S^3$, $S^4$, $S^5$, $S^6$, $S^7$, and $S^8$.

O is an inclined table, or an endless band or other automatic device, for feeding cans to the machine.

K is an endless band or other device for the automatic removal of cans from the machine.

M is a soldering-iron; Z, a lamp or gas-jet for heating the pot and iron.

Y is a can moving to the machine; Y', a can in process of soldering, and Y'' a can leaving the machine.

Upon the frame A are the shafts $S'$ to $S^8$, inclusive, carrying the following wheels: $S'$ carrying the driving-wheel B, to which the power is applied by belt or crank; $S^2$ and $S^3$ carrying the wheels C and D, to which are attached rollers for guiding and rotating the can; $S^4$ carrying the wheel F, to which are attached the disks P, for guiding and rotating the can E; $S^5$ carrying the wheel I, for raising the bar L and also rotating the arms $g$; $S^8$ carrying the wheel driving the fan R; $S^7$ and $S^6$ carrying the endless band K upon the rollers J and J.

L is a bar, carrying on its upper end a box which works vertically or obliquely in a slot in the frame A, and carries with it the shaft $S^3$, the wheel D, and the roller D D.

$i$ is a projection upon the wheel I, which lifts the bar L by contact with the pin $l$.

$r$ is a gate for regulating the flow of solder through the iron M.

T is a thumb-screw for adjusting the iron M to the wear from the revolving cans.

In Fig. 2 the can rests upon the soldering-irons M. The irons M M are supported by a flange on the inner edge of the frame A. The can is held in position by the rollers D D and C C, (see Fig. 3,) and by the disk P at each end of the can. The cam $b$ upon the shaft $S^5$ and the lever $c$, working in the grooved wheel $d$, give a horizontal movement to one of the disks P, thereby pressing P against or removing it from the can. The reciprocating disk P on the left is rotated by the wheel F on its shaft $S^4$, which, in turn, is operated by the wheel C on the shaft $S^2$ of the roller C C. (See Figs. 1 and 3.) The shaft $S^2$ has a wheel, C, on each end. The cam $a$ upon $S^5$ is connected with the soldering-iron M by the levers $h$, $k$, and $e$, and operates two valves, $r^2$ and $r^2$, (shown in Fig. 4,) for regulating the charge of molten solder. The two sets of valves $r^2$ and $r^2$ are operated together by attaching the levers $e$ and $e$, respectively, to two of the valves which are not opposite each other—one lever $e$ to the valve $r^2$ nearest the pot N, and the other lever $e$, on the other side of the machine, to the other valve $r^2$ farthest from the pot N, thereby securing simultaneous discharge of solder from the irons M M.

In Fig. 3 the can is shown resting upon the soldering-iron M and between the rollers C C and D D. M is made to fit the curved surface of the can.

In Fig. 4 the alternate movements of the valves $r^2$ and $r^2$ permit the discharge of a given quantity of solder at regular intervals. The lever $v$ is connected beneath with the lever $e$ in Fig. 2.

The operation of the machine is as follows: A number of cans being placed on the feeding-table O, they are carried singly to the machine by means of gravity, an endless band, an arm similar to $g$ upon the shaft $S^5$, a revolving wheel, or any other contrivance for moving them automatically to the soldering-irons M. Power being applied to the driving-wheel B is transmitted to the several shafts and wheels, as shown in Fig. 1. The disk P on one side being drawn back, and the bar L, with its roller D D, being raised by the mechanism already described, a can is admitted to the space between the disks P and the rollers D D and C C. The projection $i$ now releasing the pin $l$, the bar L is dropped and the roller D D is pressed downward upon the can by the action of the spring L L, and the can is thus pressed against the soldering-irons M. The disk P on one side is now pressed against one end of the can, which is firmly held in position by the two disks P. These two disks and the rollers C C and D D, revolving, rotate the can upon the soldering-irons M by means of the power derived from the wheels F, C, and D. Each successive portion of the seam is thus brought into contact with the respective soldering-irons at each end, and the two seams are soldered at one and the same time by the metal flowing from the aperture $m$. During the rotation of the can the blowers R are fanning the newly-soldered seams, thereby cooling the solder upon them, and thus preparing the cans for immediate handling or moving. The disk P is now withdrawn from the can by apparatus above explained. At the same instant the roller D D is raised, as described, and the arms $g$ and $g$ carry the can forward over the roller C C to the endless chain K, or an inclined plane or other device for removing the can, and the can is thus carried away from the machine.

What I claim is as follows:

1. In a soldering-machine, the combination of an inclined table, O, the arms $g$ $g$ on the shaft $S^5$, with the roller C C and the endless band K and means for operating the same, substantially as described and set forth.

2. The automatic alternately-reciprocating disk P and the clutch $d$ on the shaft $S^4$, together with the lever $c$, the cam $b$, the wheel G on the shaft $S^5$, in combination with the wheel $F^2$ and the other disk, P, on the shaft $S^4$, and connected means for rotating the shafts, substantially as described and set forth.

3. In combination with the solder-reservoirs N N, the two stationary and perforated soldering-irons M M, each provided with means for supporting, guiding, and soldering a can, substantially as described and set forth.

4. The combination of the two disks P P and their shafts with two solder-pots, N N, and two perforated soldering-irons, M M, curved on their upper edge to receive, support, and guide a can, substantially as described and set forth.

5. The combination of the roller D D and means for operating it with the soldering-irons M M, for holding, guiding, and rotating a can, substantially as described and set forth.

6. The combination of the rollers C C and D D and means for operating them with the two soldering-irons M M, substantially as described and set forth.

7. The combination of the rollers C C and D D and the disks P and P and connected means for rotating them with the soldering-irons M and M, substantially as described and set forth.

8. The bar L, the spring L L, the pin $l$, the projection $i$, and wheel I on shaft $S^5$, in combination with the rollers C C and D D, the disks P and P, and connected means for revolving the several shafts, and the irons M and M, substantially as described and set forth.

9. The combination of the pots N N and the soldering-irons M M, with the valves $r^2$ and $r^2$, with mechanism for operating the valves in the said irons, substantially as described and set forth.

In testimony that I claim the foregoing as my own I have hereunto affixed my signature in presence of two witnesses.

JOHN A. FORBES.

Witnesses:
ALEXANDER GOODWIN,
JAMES B. BRICE.